(12) United States Patent
Deilmann et al.

(10) Patent No.: US 10,012,964 B2
(45) Date of Patent: Jul. 3, 2018

(54) METHOD AND DEVICE FOR GEOPOSITION-BASED CONTROL OF SYSTEMS AFFECTED BY DELAYS

(71) Applicant: TADO GMBH, Munich (DE)

(72) Inventors: Christian Deilmann, Munich (DE); Johannes Schwarz, Munich (DE); Michael Munnix, Munich (DE)

(73) Assignee: tado GmbH, Munich (DE)

( * ) Notice: Subject to any disclaimer, the term of this patent is extended or adjusted under 35 U.S.C. 154(b) by 206 days.

(21) Appl. No.: 14/415,907

(22) PCT Filed: Jul. 23, 2013

(86) PCT No.: PCT/EP2013/002183
§ 371 (c)(1),
(2) Date: Jan. 20, 2015

(87) PCT Pub. No.: WO2014/015977
PCT Pub. Date: Jan. 30, 2014

(65) Prior Publication Data
US 2015/0185721 A1     Jul. 2, 2015

(30) Foreign Application Priority Data

Jul. 23, 2012 (DE) ........................ 10 2012 014 562

(51) Int. Cl.
*G05B 15/02*     (2006.01)
*H04W 4/029*     (2018.01)
(Continued)

(52) U.S. Cl.
CPC .......... *G05B 15/02* (2013.01); *H04L 12/2818* (2013.01); *H04L 12/2827* (2013.01);
(Continued)

(58) Field of Classification Search
CPC . G05B 15/02; H04L 12/2818; H04L 12/2827; H04L 12/2829; H04W 4/021; H04W 4/028
(Continued)

(56) References Cited

U.S. PATENT DOCUMENTS

2002/0072356 A1   6/2002   Yamashita et al.
2007/0233285 A1   10/2007   Yamamoto
(Continued)

FOREIGN PATENT DOCUMENTS

AT        413059 B     10/2005
EP        1102500 A2    5/2001
(Continued)

OTHER PUBLICATIONS

PCT/EP2013/002183, International Search Report, dated Jan. 7, 2014, 2 pages.
(Continued)

*Primary Examiner* — Robert E Fennema
*Assistant Examiner* — Jigneshkumar C Patel
(74) *Attorney, Agent, or Firm* — Hoffman Warnick LLC

(57) ABSTRACT

Method and device for controlling a system state of a stationary system affected by delays as a function of a variable geoposition of a person, wherein the system is to have reached a predefined presence state when the person arrives at the location of the system. The method comprises: determining the geoposition of the person; estimating the time period needed by the person from the determined geoposition until arrival at the location of the system; and specifying a reference state for changing the current system state, wherein the reference state for reaching the presence state within the estimated time period is determined as a function of the predefined presence state, the performance capability of the system and the estimated time period. The
(Continued)

device comprises similarly designed means for determining the geoposition, estimating the time period and specifying the reference state.

18 Claims, 4 Drawing Sheets

(51) Int. Cl.
*H04W 4/021* (2018.01)
*H04L 12/28* (2006.01)
*H04W 4/02* (2018.01)

(52) U.S. Cl.
CPC ......... *H04L 12/2829* (2013.01); *H04W 4/021* (2013.01); *H04W 4/028* (2013.01); *H04W 4/029* (2018.02)

(58) Field of Classification Search
USPC .......................................................... 700/66
See application file for complete search history.

(56) References Cited

U.S. PATENT DOCUMENTS

| | | | | |
|---|---|---|---|---|
| 2008/0103686 | A1* | 5/2008 | Alberth | G01C 21/00 701/532 |
| 2010/0127854 | A1 | 5/2010 | Helvick et al. | |
| 2010/0161149 | A1 | 6/2010 | Nguyen et al. | |
| 2010/0198367 | A1* | 8/2010 | Petricoin, Jr. | G01S 5/0018 700/17 |
| 2011/0106278 | A1* | 5/2011 | Martin-Cocher | G06Q 10/06314 700/90 |

FOREIGN PATENT DOCUMENTS

| | | |
|---|---|---|
| EP | 2330470 A1 | 8/2011 |
| EP | 2372263 A2 | 10/2011 |
| EP | 2675137 A1 | 12/2013 |

OTHER PUBLICATIONS

Weigert, Tado: Smart Remote Control for Heating Installations, May 2012.

Scott et al., "Home Heating Using GPS-Based Arrival Prediction," published Feb. 2010, 7 pages.

Gupta et al., "A Persuasive GPS-Controlled Thermostat System," Massachusetts Institute of Technology, Sep. 2008, 89 pages.

Gupta et al., "Adding GPS-Control to Traditional Thermostats: An Exploration of Potential Energy Savings and Design Challenges," Lecture Notes in Computer Science, vol. 5538, pp. 95-114, May 2009.

* cited by examiner

METHOD AND DEVICE FOR GEOPOSITION-BASED CONTROL OF SYSTEMS AFFECTED BY DELAYS

FIELD OF THE INVENTION

The present disclosure relates to a method and a device for controlling the system state of a system affected by delays on the basis of geoposition data of a person. In particular the invention relates to a method and a device for controlling the system state in the absence of the person from the location of the system, with the aim of constantly specifying the system state so that the system can reach a predefined presence state within an estimated time until the arrival of the person at the location of the system.

BACKGROUND OF THE INVENTION

Many technical systems require a certain time after a new set point (reference variable) has been specified in order to reach this new set point or reference state. For example a heating system requires, after a room temperature has been specified that is higher than a currently measured temperature, a while until this higher room temperature is reached in the room. The system thus reaches the specified set point only after a delay. Accordingly, systems which reach their set point or reference state only after a certain time span are referred to in the present disclosure as being "affected by delays". The delay is substantially determined by the performance capability, with which the system reacts to a sudden change in the reference variable to reach the new set point within a certain time. Therefore, where reference is made within the scope of this disclosure to "performance capability", this means the speed, at which a new set point is reached in the event of a sudden change in the reference variable.

Nowadays consumers expect technical systems to be immediately available with the desired performance level or power when needed. If systems cannot achieve this on account of physical conditions, consumers frequently decide to permanently operate systems at the desired performance level or power, even if the continuous operation of the system is associated with higher energy consumption. A typical example is constituted by heating systems. A consumer who has been away and is coming home would like to return to a warm home. In order to guarantee this, he frequently decides to operate the heating system with non-reduced power also during his absence. The savings advantage achieved by "turning down" the heating system often has a lower significance in the consumer's perception than the comfort of a warm home upon arrival. In contrast, the savings advantage with systems that are immediately available with the desired power is the predominant factor for the average consumer. A typical example of this is electric light from a light bulb. When the light switch is activated, light is immediately available with virtually maximum power. Switching off the light does not therefore mean any loss of comfort, or only a limited loss of comfort, for the consumer.

On account of physical conditions, the reaction behaviour (reaching of the specified reference state or set point by the system) of systems affected by delays to a sudden change in the reference variable in general cannot be accelerated, or can only be accelerated to a limited extent. Consequently, in the past, different technical solutions were concocted that were intended to automatically achieve an adaptation of the power requirement to the needs of a user.

A classic example from the state of the art is timers, which automatically reach and maintain a specified power on a system affected by delays as a function of the time of day. A disadvantage of such systems is that timers can only insufficiently reflect the actual power needs of a user of the system affected by delays. Although a timer can reproduce the usual daily routine of a user well, it is by no means able to react dynamically to changes in the needs of the user. For example, a timer of a heating system will always switch on the heating at the programmed switch-on time, irrespective of whether the user actually requires this at this point in time. Timers are commonly set so that the heating switches on for example daily at 1700 hours, this setting being based upon the assumption that the user comes home at 1700 hours. If he does not actually come home at this time, the heating is still switched on and heat energy is thus wasted. Similarly, a timer cannot detect if a user returns at an earlier time than the programmed time.

A modern approach to the needs-based control of building technical components, such as for example a HVAC (Heating, Ventilation and Air Conditioning) system, is described in DE 10 2011 052 467. According to the solution proposed therein, a building technical component is to be operated at a higher power if a user of the building is within a geozone defined around the building. A more extensive geozone concept of this application provides for the defining of a plurality of different geozones around a building, whereby geozones lying closer to the building are respectively linked with a higher power specification to the building technical component. The power can thus be increased in stages as the user approaches the building.

In the case of such a geozone-based control of the power specification, the specifying of the power is determined substantially as a function of the distance of a user from the building. A disadvantage of such distance-based controls is that the distance only indirectly correlates with an actual arrival time of the user, since the distance alone does not contain any information on the actual journey duration of the user from the geozone/the geoposition to the building. Decisive influencing factors on the journey duration are indeed, besides the distance, also the current speed, the selected travel route, the mode of travel (car, bicycle, walking) and/or the currently prevailing traffic conditions. The arrival time can thus only be imprecisely predetermined from the distance alone. This leads to a power specification to the system that is not optimally tailored to the arrival of the building user.

A further disadvantage of the known geozone-based control is that a system is constantly only lowered to a power specification that is determined on the basis of the current distance of the user from the building. If a user remains for a longer time at a certain location, it would be advantageous if the system could also be operated for the majority of this time with a lower power specification than would be the case purely according to the distance. However, such a further reduction in the power specification is not possible with a purely distance-based control, because a corresponding power requirement is always assigned to a distance with this type of control system.

SUMMARY OF THE INVENTION

Against this background it is thus an object of the invention to provide a method and a device for geoposition-based control of a system state of a system affected by delays which controls the system state in the absence of a person assigned to the system in such a way that the system is constantly operated in a system state, from which the system can reach, having regard to the system-specific delay or its own performance capability and the current geoposition of the person, a predefined presence state by the time of arrival of the person at the location of the system.

This object can be achieved by the features described herein.

A method for controlling a delay-affected stationary system as a function of a variable geoposition of at least one person is proposed.

A "system affected by delays" according to the meaning of this disclosure is a system, wherein the controlled variable (e.g. an inside room temperature or state of charge (SOC)) only reacts with a delay to a change in the reference variable (e.g. a reference temperature, a reference state of charge). Examples for such systems affected by delays are heating systems, air conditioning systems, energy storage systems, hot water boilers and energy storage systems in electric vehicles. "Systems" according to this meaning are, however, also heated, cooled or air conditioned rooms, homes and other buildings. The delay results from the limited performance capability of such systems that is generally due to physical reasons. A heating system can generally only heat a room for example at a maximum of 2 K/h.

"Stationary" according to the meaning of this disclosure does not mean that the system is completely immobile, but instead it is intended to express that the system is stationary during the implementation of the method. Accordingly, the following systems can in particular be regarded as stationary systems: heating systems, cooling systems, air conditioning systems, energy storage systems, hot water boilers, energy storage devices of electric vehicles, or even a room, a home or another building.

A proposed method has the aim of controlling the system such that it is to have reached a predefined presence state when the person arrives at the location of the system. In the case of the system state to be controlled being a temperature for example of a living space, the presence state can be a certain temperature that the person has selected as a "comfortable" inside room temperature. The method distinguishes between a presence state, in which the person is at the location or is in a certain vicinity around the location of the stationary system, and an absence state, in which the person is further than a defined minimum distance from the location of the stationary system.

A method comprises initially determining the geoposition of a person who is using the system to be controlled (e.g. a room or building user). Determining the geoposition of the person can be achieved through different technologies. It suffices that the method can access a geoposition of the person. For the detection of his geoposition, a person must usually carry a device with him that is designed to determine geoposition data. Typically, modern mobile phones are equipped as standard with such means. By means of a software application provided on the mobile phone, the geoposition data are then transmitted for example to a further point such as a remote control system. Various software packages can be installed on the most varied mobile phones and can be designed to transmit the geoposition data of the mobile phone user to an internet server. The internet server provides an interface, via which the geoposition data of a user can then be read. The determined geoposition data are then accessible for the proposed methods and the proposed devices disclosed according to various embodiments.

Furthermore a proposed method comprises: estimating a time period required by the person from the determined geoposition to arrive at the location of the system.

Finally, one method comprises: specifying a reference state to the system which is selected so that the system can reach the presence state within the estimated time period, within a defined tolerance range, taking into account the system-specific delay or system-specific performance capability. The reference state to be specified is determined as a function of the predefined presence state, the performance capability of the system and the estimated time period.

Specifying such a reference state to the system can be realised for example by multiplying the estimated time period by a stored gradient which constitutes a measure for the performance capability of the system. The gradient describes the reaching of a reference state per time unit. If the stationary system is for example a heating, cooling or air conditioning system, the gradient can describe the cooling or heating behaviour over time of a room, a home or other building. In the same way the gradient can describe the time behaviour of the charging and discharging process of an energy storage system.

Using the example of temperature control of a room, the predefined presence state can be for example an inside room temperature of 21° C. The performance capability of the system is known and is 2 K/h. Accordingly, in the case of an estimated time period of 2 hours until the person arrives at the location of the system, a reference state of 19° C. would be specified.

According to a variant of a method according to various embodiments, the estimation of the time period further comprises matching the determined geoposition with stored geoposition locations, for which at least one leaving time has previously been stored or saved. If the determined geoposition and one of the stored geoposition locations coincide, the time between the current clock time and the next, in temporal terms, statistically relevant leaving time saved for this geoposition location is regarded as the waiting time and is taken into consideration in estimating the time period. The next, in temporal terms, leaving time is the leaving time which, among the leaving times saved for the geoposition location, follows the current clock time. A "statistically relevant leaving time" means a leaving time, to which a statistically highlighted significance is assigned, among the leaving times saved for a geoposition location.

An example can be given as follows: a workplace can by all means be left at different times, but whereby the same statistical weighting is not assigned to each of these leaving times. Generally, a person will leave his workplace for example at 1700 hours to set off for home. It may also arise, however, that the same person has already set off for home at 1200 hours on a single day. However, only a low statistical relevance is then assigned to this single occurrence. In order to determine the statistical relevance of the different leaving times, in addition to the leaving time the frequency of leaving the geoposition location at the respective leaving time can be previously saved.

If the person is still at his workplace for example at 1500 hours, whereby 1700 hours has been saved as the next, in temporal terms, statistically relevant leaving time for this person, the waiting time at 1500 hours is 2 hours.

According to a further variant of the embodiments, estimating the time period includes determining a journey duration from the determined geoposition location to the location of the system. Such a determination of the journey duration can be realised for example on the basis of average movement speeds of the person to date and the distance of the determined geoposition location from the location of the system.

The determination of the journey duration between the location of the system and the geoposition location of the person can, however, also be realised for example using, or with the aid of, a navigation/routing algorithm, as known from the commercially available GPS navigation units or the web application Google Maps. A navigation/routing algorithm is designed to determine a journey duration with the aid of stored maps and in particular with the aid of stored anticipated speeds for different roads.

According to a characterisation of the determination of the journey duration, provision can be made for geoposition locations to be stored, for which associated journey durations or average travel speeds have been previously saved. These journey durations or average travel speeds can be based upon previously measured journey durations or speeds which a person has actually required in the past to arrive at the location of the system. According to this method variant, a currently determined geoposition of the person is compared with the stored geopositions. If the determined geoposition and a stored geoposition location coincide, a journey duration or speed saved for the geoposition location is used to determine the journey duration.

If the determined geoposition of the person does not coincide with a stored geoposition location, the saved journey duration or speed of the geoposition location that is closest to the currently determined geoposition can also be used.

However, in various embodiments, only a limited number of the plurality of possible geoposition locations, at which a person may spend time, are considered for retention purposes to determine the waiting time and journey duration. In the determination with the aim of retaining a geoposition location, a geoposition location can stand out from any given geoposition locations, i.e. it can qualify as a geoposition location to be stored, due to the fact that the person remained there in the past for a certain while and then set off from there to the location of the system.

A further development of the methods make provision to carry out the control of the stationary system on the basis of the geopositions of a plurality of persons, whereby a time period is estimated for each person and a reference state is specified to the system for the shortest estimated time period.

For the sake of completeness, it should be noted that various methods do not provide for detection of the current system state and furthermore does not incorporate this into the specification of the reference state. The reason for this is that these proposed methods only deal with the specifying of a meaningful reference variable, thus the specifying of a set point. The controlling of the controlled variable to meet the specified reference variable (e.g. the specified set point) is realised at a lower level by means of a closed-loop control and through usual closed-loop control solutions such as for example PID or state space controllers.

The general methods and the general devices described will be described in more detail by way of example for a room temperature control system.

Method and device for specifying the reference temperature to a temperature control system of a room as a function of a location, at which a person remains for a time period, wherein a maximum possible heating speed of the room is given, wherein a reference temperature of the room that is to be reached by the time of arrival of the person at the room is specified, characterised in that an absence period until the arrival of the person at the room is estimated as a function of the location, at which the person remains for a while, whereby, as a function of the reference temperature upon arrival, the absence period and the maximum possible heating speed, a current reference temperature specification is computed which is required in order to be able to heat the room to the specified reference temperature by the time the person arrives.

Similarly, the methods and the devices can also be used for cooling with an air conditioning system.

BRIEF DESCRIPTION OF THE DRAWINGS

The invention will be described in more detail below by reference to the attached drawings, in which.

DETAILED DESCRIPTION OF THE DRAWINGS

Figure 1:
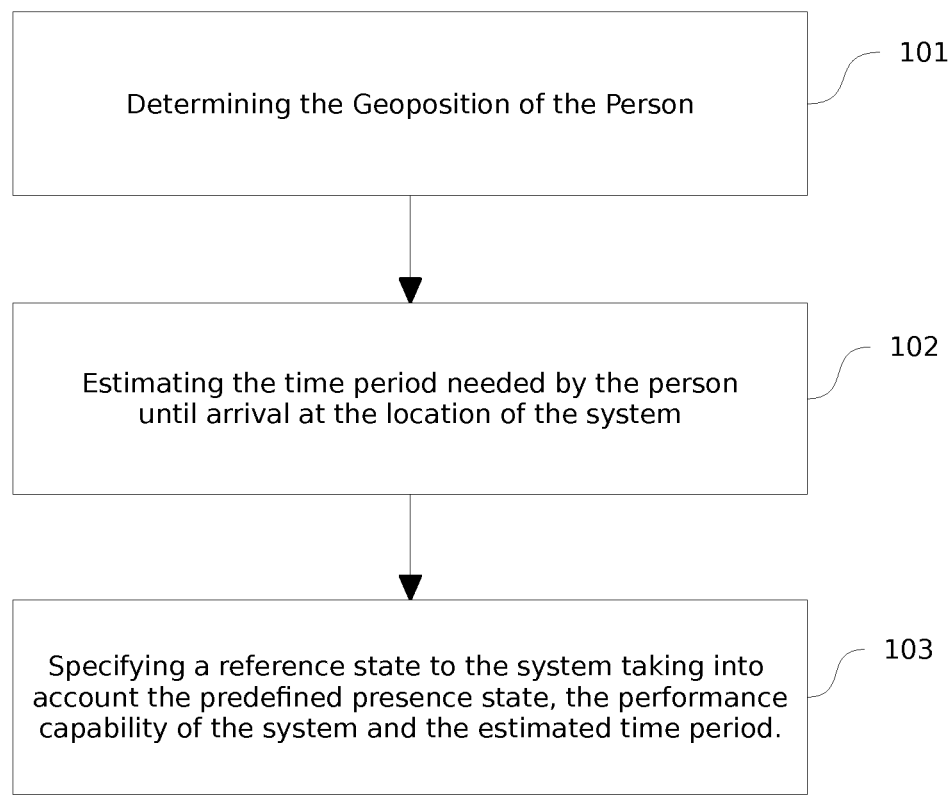
FIG. 1 shows a schematic flowchart which provides an overview of the method according to the invention for controlling a system affected by delays.

The schematic sequence in FIG. 1 provides an overview of the steps of the method according to the invention. In method step 101, the geoposition of a person is determined. This can usually be realised via a software application on a mobile phone of the person. In method step 102, a time period is estimated that is needed by the person from the determined geoposition until arrival at the location of the system. Finally, in method step 103, a reference state is specified to the system which is selected so that the system can reach a presence state desired by the person within the determined time period. This reference state is determined taking into account the predefined presence state, the performance capability of the system and the estimated time period from step 102.

Figure 2:
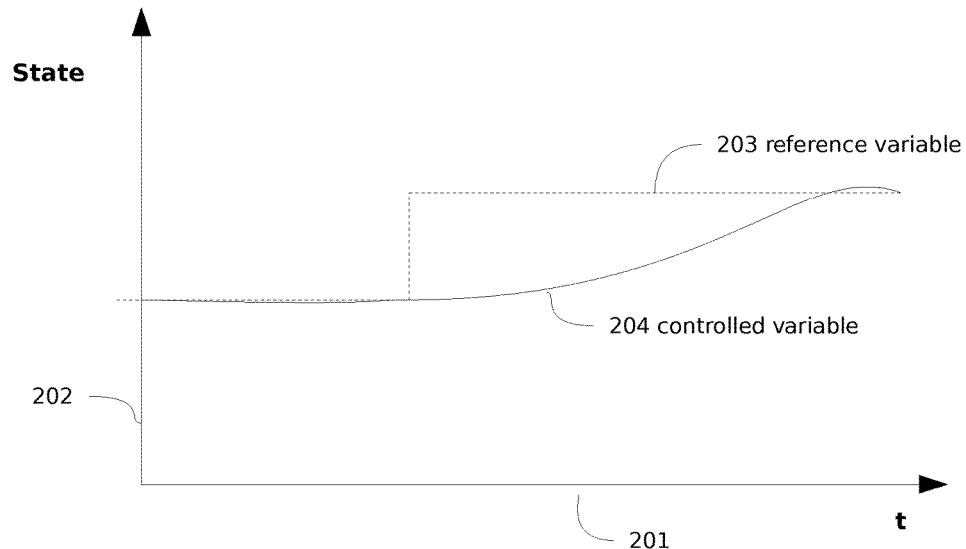
FIG. 2 shows a typical progression of the reaction of the controlled variable of a system affected by delays to a sudden change in the reference variable.

FIG. 2 shows the typical progression of the reaction of the controlled variable of a system affected by delays to a sudden change in the reference variable. The delay thereby results in general due to a limited performance capability of the system, so that reference can alternatively also be made to a system with given performance capability. In FIG. 2, the time is plotted on the X axis 201 and a variable of the system generally designated as the state is plotted on the Y axis 202. A state could for example be the inside temperature of a heated or a cooled or air conditioned room. A reference state or set point is specified to the system via the reference variable 203, but the controlled variable 204 does not reach this reference state or set point until after a delay of a certain time. Usual delays within the scope of inside temperature control lie in the range of from 0.01-5 K/h, 0.1-5 K/h, 0.2-4 K/h, 0.5-3 K/h or 1-3 K/h. A delay of 1 K/h means that a sudden change in the reference variable or the set point of 1 K can be detected in the controlled variable only after 1 hour.

Figure 3:
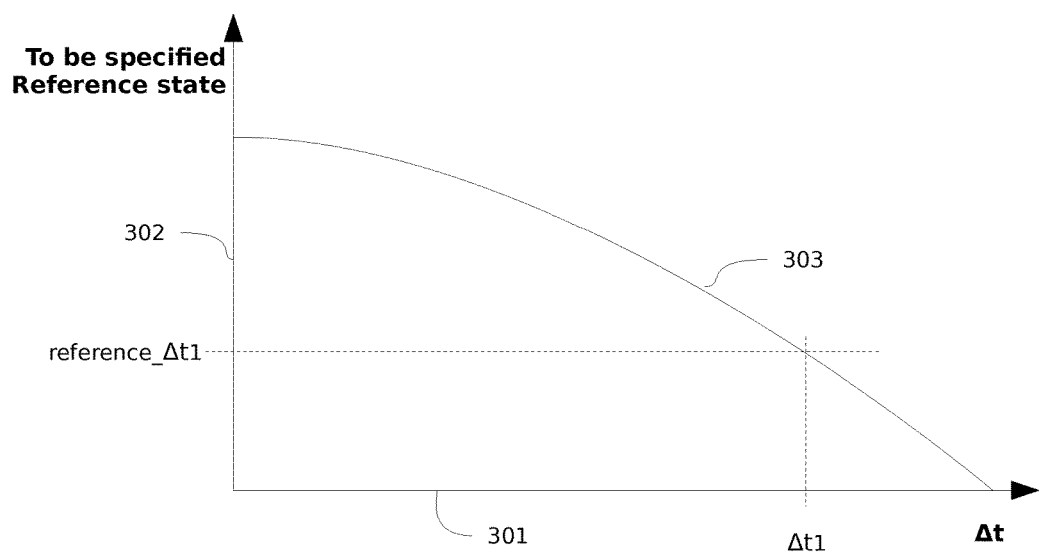
FIG. 3 shows an example for a function, from which an associated specification of a system state can be read for a given time period (from the determined geoposition until the arrival of the person at the location of the system), wherein the system states to be specified are selected for the respective time period so that a desired reference state can be reached within the time period.

In FIG. 3, the time period Δt that the person needs from the determined geoposition until arrival at the location of the system is plotted on the X axis 301. A variable of the system generally described as "reference state to be specified" is shown on the Y axis 302. In the case of the example of the heated or cooled or air conditioned room, this is the inside temperature of the heated or cooled or air conditioned room. If on the other hand one considers the example of an energy storage device, a meaningful corresponding variable of the system would be for example the state of charge of the energy storage device. It is thus possible to read from the function curve 303 of FIG. 3, with a given time period Δt1 needed by the person until arrival at the location of the system, the specification of the system state reference_Δt1. This may be necessary in order to reach, within the time period Δt1, a reference state desired at the time of the arrival of the person at the location of the system. On the basis of such a predetermined function curve 303, according to a variant of a method according to various embodiments of the invention, the reference variable to be specified can be determined.

Figure 4:
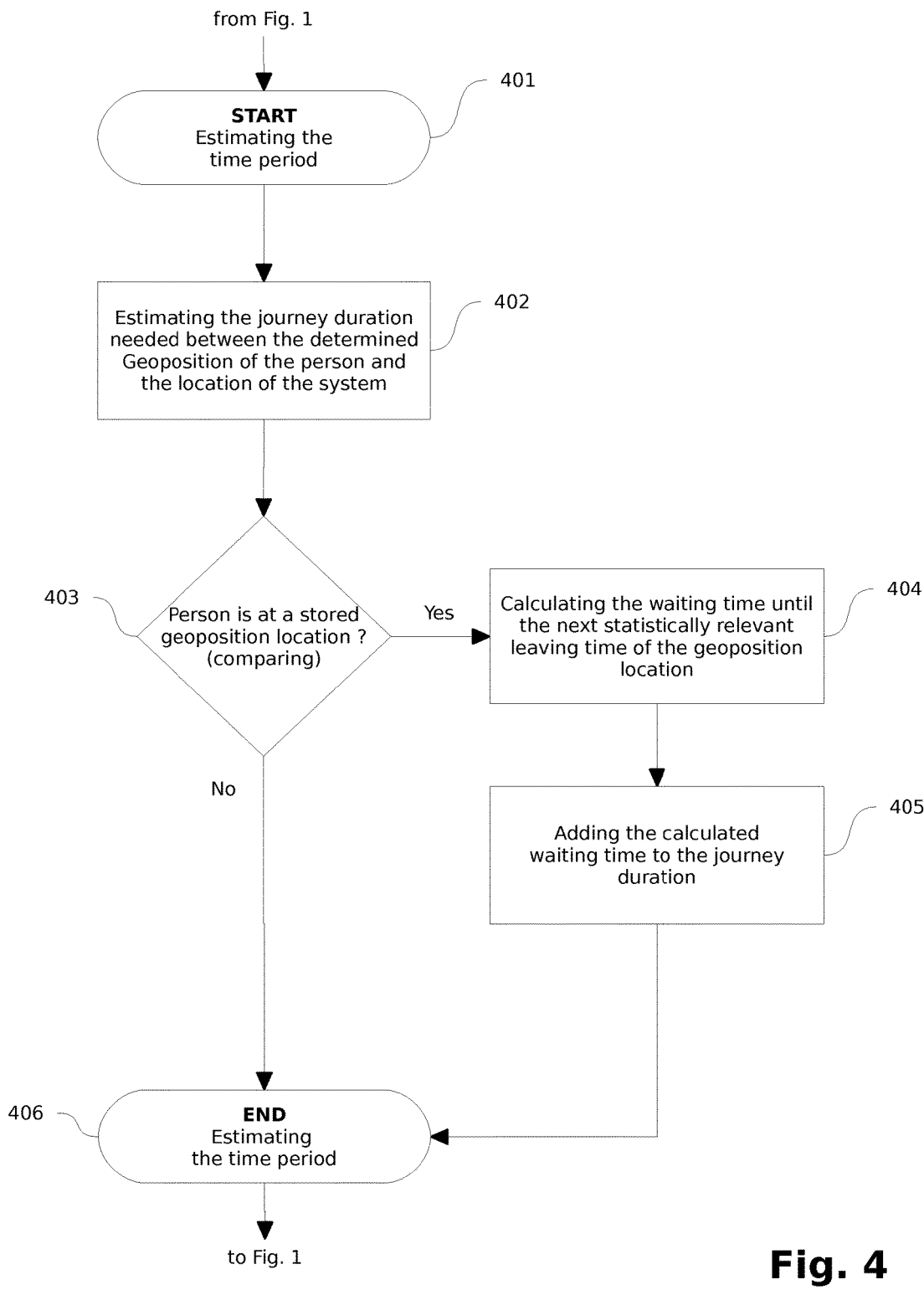
FIG. 4 shows a schematic flowchart of a sequence of method steps to estimate the time period from the determined geoposition until the arrival of the person at the location of the system.

FIG. 4 shows a first alternative of possible sub-steps of the method step 102 of the method shown in FIG. 1. More precisely, it is a detailed view of a first possible alternative for estimating the time period until the arrival of the person at the location of the system. According to this first alternative, the method step 102 of FIG. 1 comprises here the steps 401 to 406. The sequence begins with step 401. In step 402, the journey duration is determined that is needed by the person to get from the geoposition determined in step 101 to the location of the system. In the simplest case, a journey duration can be determined here solely from the distance of the geoposition location from the location of the system. For example, a general empirical principle can be used, according to which a journey duration usual for such a distance is assigned to a certain distance. Alternatively, a general, i.e. geoposition-independent, average travel speed could be stored for the person, from which the journey duration can be determined by means of the distance. A further alternative, which can also be applied in combination with the aforementioned examples, is to determine an average travel speed from a current temporal change, i.e. change over time, in the geoposition of the person. The journey stretch or distance can be determined both as a linear distance ("as the crow flies") and also as a distance on the basis of actual roads, for example a map. In step 403, it is checked whether the person is currently spending time at a stored geoposition location.

If this is the case, reference can be made back to at least one saved leaving time for the geoposition location. In step 404, this information is used in order to calculate the waiting time from the current clock time until the saved leaving time of the geoposition location for the person. In principle, a plurality of leaving times can also be saved for a geoposition location, whereby the next, in temporal terms, statistically relevant leaving time associated with the person and the geoposition location is used to calculate the waiting time until the saved leaving time. In step 405, the result of the calculation is then added to the journey duration from step 404. Subsequently, the result is forwarded via step 406 to step 103 in FIG. 1.

If the check in step 403 shows that the current geoposition of the person is not a stored location of the person, the journey duration determined in step 402 is directly forwarded as a time period via step 406 to step 103 in FIG. 1.

Figure 5:
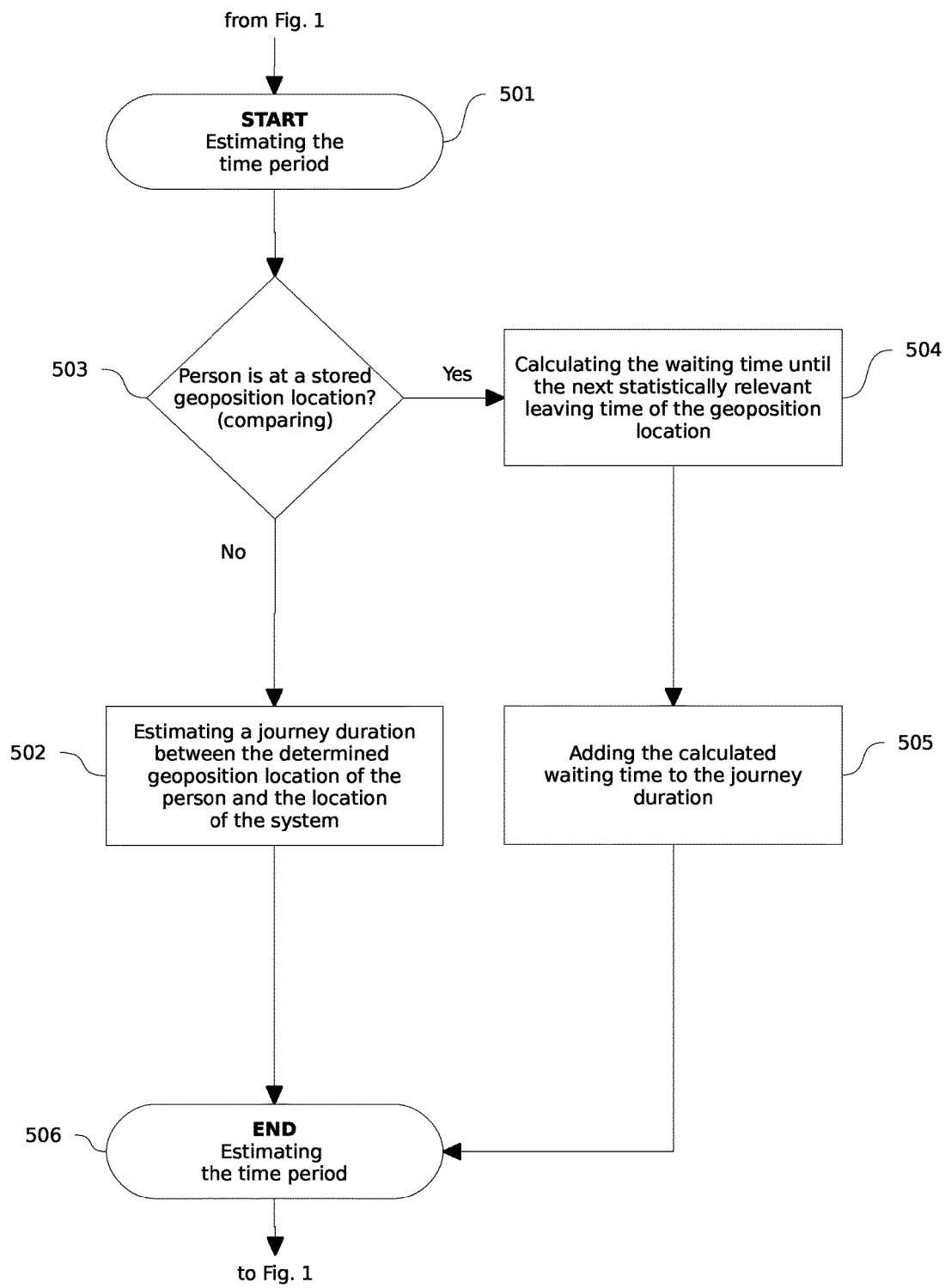
FIG. 5 shows a schematic flowchart of an alternative sequence of method steps to estimate the time period from the determined geoposition until the arrival of the person at the location of the system.

FIG. 5 reproduces a second alternative of possible substeps of the method step 102 of FIG. 1. Consequently, FIG. 5 is a detailed view of a second possible alternative for estimating the time period until the arrival of the person at the location of the system. The sequence begins, similarly to the sequence of FIG. 4, with step 501. In contrast with the sequence in FIG. 4, the decision 503 directly follows step 501. It is checked in step 503 whether the person is currently spending time at a stored geoposition location.

If this is the case, there are also at least one saved leaving time and one saved journey duration for the geoposition location, said journey duration describing how long the person generally needs for the route from the geoposition location to the location of the system. These two stored time values are used in steps 504 and 505 in order to estimate the time period until the arrival of the person at the location of the system. In step 504, the time from the current clock time until the next, in temporal terms, statistically relevant saved leaving time is calculated. In step 505, the saved journey duration is added to this result. The result is subsequently forwarded via step 506 to step 103 in FIG. 1.

If the check in step 503 shows on the other hand that the current geoposition of the person is not a stored location of the person, the journey duration is used instead, in step 502, as the time period and forwarded via step 406 to step 103 in FIG. 1.

The invention claimed is:

1. Method for controlling a system state of a stationary system affected by delays as a function of a variable geoposition of a person, wherein the system is to have reached a predefined presence state when the person arrives at the location of the system, the method comprising:

determining the geoposition of the person;

estimating the time period needed by the person from the determined geoposition until arrival at the location of the system, wherein estimating the time period includes:

determining whether the determined geoposition of the person coincides with one of a plurality of stored geoposition locations, wherein for a plurality of geoposition locations, at least one leaving time is respectively saved, and for some of the plurality of geoposition locations, a respective plurality of leaving times is saved, wherein for the some of the plurality of geoposition locations, each of the respective plurality of leaving times is a point in time, if the determined geoposition of the person coincides with one of the plurality of stored geoposition locations: calculating a waiting time from a current clock time until a next leaving time stored for the one of the plurality of stored geoposition locations, if the determined geoposition of the person does not coincide with one of the plurality of stored geoposition locations: determining a journey duration between the determined geoposition of the person and the location of the system, wherein the estimation of the journey duration is realised by applying a navigation/routing algorithm, and calculating the time period needed by the person until arrival at the location of the system using the waiting time;

specifying a reference state for changing the current system state, wherein the reference state for reaching the presence state within the estimated time period is determined as a function of the predefined presence state, the performance capability of the system and the estimated time period;

setting the system state of the stationary system to the reference state; and controlling the stationary system based on the reference state.

2. Method according to claim 1, wherein determining the journey duration comprises reverting back to a previously saved journey duration or average speed, wherein for this purpose the determined geoposition is compared with stored geoposition locations, for each of which a journey duration or an average speed between the stationary system and the determined geoposition location has been previously saved, wherein if the determined geoposition and one of the stored geoposition locations coincide, the saved journey duration or average speed for this geoposition location is used to determine the journey duration.

3. Method according to claim 2, wherein each of the plurality of stored geoposition locations is characterised in that the person has in the past remained there for a certain duration and set off from there for the location of the system.

4. Method according to claim 1, wherein the performance capability of the system is described by a previously determined gradient which represents a measure for reaching a reference state per time unit in response to a change in the reference state.

5. Method according to claim 4, wherein the gradient describes the cooling or heating behaviour over time of a room, a home or a building, or the charging behaviour over time of an energy storage system.

6. Method according to claim 1, wherein the control of the stationary system is realised on the basis of the geopositions of a plurality of persons and a time period is estimated for each person, wherein the specifying of a reference state is realised on the shortest estimated time period.

7. Method according to claim 1, wherein a stored geoposition location is characterised in that the person has in the past remained there for a certain duration and set off from there for the location of the system.

8. Method according to claim 1, wherein the stationary system is a heating system, an air conditioning system, an energy storage system, a hot water boiler, an energy storage device of an electric vehicle or a heated or air conditioned room, a heated, cooled or air conditioned home, or a heated, cooled or air conditioned building, wherein the system state is a room temperature, a storage device state, a temperature, a water temperature or a state of charge.

9. The method of claim 1, wherein the reference state includes a temperature value.

10. A device for controlling a system state of a stationary system affected by delays as a function of a variable geoposition of a person, wherein the system is to have reached a predefined presence state when the person arrives at the location of the system, comprising:
the device configured to:
determine the geoposition of the person;
estimate a time period needed by the person from the determined geoposition until arrival at the location of the system,
wherein estimating the time period includes:
determining whether the determined geoposition of the person coincides with one of a plurality of stored geoposition locations,
wherein for a plurality of geoposition locations, at least one leaving time is respectively saved, and for some of the plurality of geoposition locations, a respective plurality of leaving times is saved,
wherein for the some of the plurality of geoposition locations, each of the respective plurality of leaving times is a point in time,
if the determined geoposition of the person coincides with one of the plurality of stored geoposition locations: calculating a waiting time from a current clock time until a next leaving time stored for the one of the plurality of stored geoposition locations,
if the determined geoposition of the person does not coincide with one of the plurality of stored geoposition locations: determining a journey duration between the determined geoposition of the person and the location of the system, wherein the estimation of the journey duration is realised by applying a navigation/routing algorithm, and
calculating the time period needed by the person until arrival at the location of the system using the waiting time;
specify a reference state for changing the current system state;
determine the reference state for reaching the presence state within the estimated time period as a function of the predefined presence state, the performance capability of the system and the estimated time period;
set the stationary system to the reference state; and
control the stationary system based on the reference state.

11. Device according to claim 10, wherein determining the journey duration comprises reverting back to a previously saved journey duration or average speed, wherein for this purpose the determined geoposition is compared with stored geoposition locations, for each of which a journey duration or an average speed between the stationary system and the determined geoposition location has been previously saved, wherein if the determined geoposition and one of the stored geoposition locations coincide, the saved journey duration or average speed for this geoposition location is used to determine the journey duration.

12. Device according to claim 10, wherein the performance capability of the system is described by a previously determined gradient which represents a measure for reaching a reference state per time unit in response to a change in the reference state.

13. Device according to claim 12, wherein the gradient describes the cooling or heating behaviour over time of a room, a home or a building, or the charging behaviour over time of an energy storage system.

14. Device according to claim 10, wherein the control of the stationary system is realised on the basis of the geopositions of a plurality of persons and a time period is estimated for each person, wherein the specifying of a reference state is realised on the shortest estimated time period.

15. Device according to claim 10, wherein each of the plurality of stored geoposition locations is characterised in that the person has in the past remained there for a certain duration and set off from there for the location of the system.

16. Device according to claim 10, wherein the stationary system is a heating system, an air conditioning system, an energy storage system, a hot water boiler, an energy storage device of an electric vehicle or a heated or air conditioned room, a heated, cooled or air conditioned home, or a heated, cooled or air conditioned building, wherein the system state is a room temperature, a storage device state, a temperature, a water temperature or a state of charge.

17. The device of claim 10, wherein the reference state includes a temperature value.

18. A method for controlling a system state of a stationary system affected by delays as a function of a variable geoposition of a person, wherein the system is to have reached a predefined presence state when the person arrives at the location of the system, the method comprising:
   determining the geoposition of the person;
   estimating the time period needed by the person from the determined geoposition until arrival at the location of the system,
   wherein estimating the time period includes:
      determining whether the determined geoposition of the person coincides with one of a plurality of stored geoposition locations,
      wherein for a plurality of geoposition locations, at least one leaving time is respectively saved, and
      for some of the plurality of geoposition locations, a respective plurality of leaving times is saved, wherein for the some of the plurality of geoposition locations, each of the respective plurality of leaving times is a point in time,
      if the determined geoposition of the person coincides with one of the plurality of stored geoposition locations: calculating a waiting time from a current clock time until a next leaving time stored for the one of the plurality of stored geoposition locations, and
      calculating the time period needed by the person until arrival at the location of the system using the waiting time,
   wherein estimating the time period further comprises determining a journey duration between the determined geoposition of the person and the location of the system, wherein the estimation of the journey duration is realised by applying a navigation/routing algorithm,
   wherein determining the journey duration comprises reverting back to a previously saved journey duration or average speed, wherein for this purpose the determined geoposition is compared with stored geoposition locations, for each of which a journey duration or an average speed between the stationary system and the determined geoposition location has been previously saved, wherein if the determined geoposition and one of the stored geoposition locations coincide, the saved journey duration or average speed for this geoposition location is used to determine the journey duration;
   specifying a reference state for changing the current system state, wherein the reference state for reaching the presence state within the estimated time period is determined as a function of the predefined presence state, the performance capability of the system and the estimated time period;
   setting the system state of the stationary system to the reference state; and controlling the stationary system based on the reference state.

* * * * *